Oct. 3, 1944. H. CORY 2,359,405
COFFEE BREWER
Filed July 27, 1942
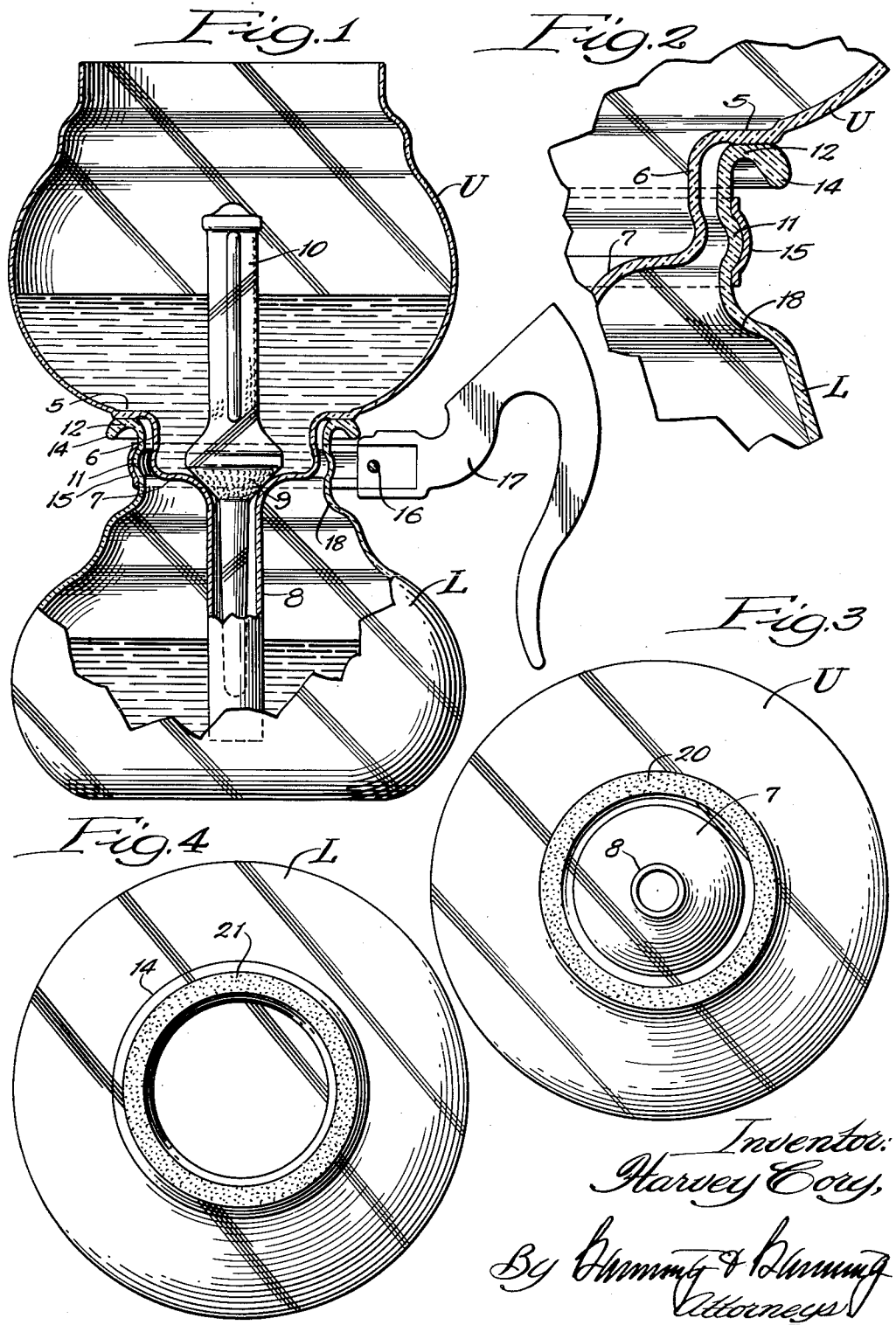
Inventor:
Harvey Cory,
By Cumming & Cumming
Attorneys Patented Oct. 3, 1944

2,359,405

UNITED STATES PATENT OFFICE 2,359,405

COFFEE BREWER

Harvey Cory, Chicago, Ill.

Application July 27, 1942, Serial No. 452,389

3 Claims. (Cl. 99—292)

This invention relates generally to a coffee brewing utensil in which are comprised upper and lower interfitting vessels with an interposed filter through which the coffee infusion passes from the lower into the upper vessel and vice versa.

More particularly the present improvements are concerned with a utensil of this type wherein the vessels of glass, or other ceramic material, may be formed by machine production. Each vessel provides a bowl, the upper in the form of a funnel and the lower in the form of a decanter. For brewing operations, a seal is requisite between the two vessels so that a condition of pressure, plus or minus, may be maintained in the lower bowl.

In the machine production of glass coffee brewers the interfitting surfaces of the two bowls are found often to be out-of-round to the point that they must be rejected. This is so even though such inaccuracies be compensated for in part by the use of a resilient gasket, as of rubber, which is interposed between the surfaces where a seal is to be established. Not only is the gasket objectionable from the standpoint of cost, but more so because of its deterioration rate which limits its satisfactory operation to a relatively short life. In addition, such a gasket tends to adhere nonreleasably to one of the engaged surfaces so as to interfere with ready separation of one bowl from the other. Also there is a popular belief that the flavor or aroma of the coffee is affected undesirably by the presence of rubber on or in connection with the brewing utensil. It is because of such drawbacks that the present sealing means, usually a rubber gasket, leaves much to be desired.

According to my present invention, no sealing gasket whatever need be employed. Instead, the two vessels of the coffee brewing utensil may be produced by machine methods as heretofore, but with the surfaces which are to interengage being specially formed for this facile establishment of a satisfactory seal which is susceptible of being readily broken. For this purpose each of the engaging surfaces is subjected to a brief grinding operation which does two things: (1) removes any inaccuracies resulting from an undulating or out-of-flat configuration, and (2) conditions the areas so treated to the point that each will coact with the other to form therewith a seal which is susceptible of being broken with a minimum of effort. In addition, the grinding operation may provide contacting surfaces which will permit of operative placing of one vessel relative to the other in various positions in all of which free separation of one from the other is possible. With such a construction a satisfactory operation of the coffee brewer is assured because both plus and minus pressures, in succession, can be maintained in the lower bowl, thereby causing the coffee infusion first to rise and then descend again as is necessary in all such brewing operations.

As a further object of this invention, I aim to provide a sealing surface which is located upon the very top of the lower bowl where its wall thickness is increased somewhat and its edge portion is turned out and down to afford (a) an enhanced reinforcing flange at a point where destructive impacts are commonly encountered and (b) a rounded lip over which the coffee infusion may be poured with a minimum of drip liability. In addition, the bowl neck immediately below this flange is circumferentially corrugated, preferably outwardly, to acquire added strength for withstanding compressive forces received from a surrounding clamp or collar in connection with a handle that is provided for the bowl. In this way the bowl neck is able to resist successfully strains which would otherwise tend to breakage at this vulnerable point. These and other objects which will hereinafter appear may be attained by a construction of which a suggestive exemplification is illustrated in the accompanying drawing in the manner following—

Figure 1 is a view, mostly in vertical section, of two operatively assembled units of the present coffee brewer;

Fig. 2 is an enlarged detail in section, showing the contacting surfaces of the two bowls of the brewer; and Figs. 3 and 4 are bottom and top plan views, respectively, of the upper and lower bowls shown in Fig. 1.

The coffee brewer with which I am here concerned comprises an upper bowl U having convexly curving walls which in the lower region of the bowl are formed to provide a flat annular base 5 below which the bowl walls continue downwardly, through a region of decreased diameter as at 6, and then inwardly again to form a convex seat 7 from which depends a hollow stem 8. Against the seat may be rested a filter element here shown as a ball 9 having a coarse stippled surface, the ball being formed as part of a rod 10 of glass or the like and disposed intermediately of the ends thereof.

An upper bowl of this general construction is adapted for cooperation with a lower bowl L whereon is extended a circular neck 18. As shown, the internal diameter of the neck is greater than is the external diameter of the walls 6 of the upper bowl to provide therebetween a substantial clearance which will permit one bowl to shift laterally of the other bowl, if desired. The neck may also be outwardly convexed to form, in effect, a circumferential corrugation 11, and thereabove it is laterally flanged at 12, its edge portion being then downwardly turned to terminate in a depending lip 14. Throughout the neck region, including particularly the flange and lip, the thickness of the bowl walls is materially increased, principally for added strength. Enhanced resistance to breaking strains is also provided in the circumferential corrugation 11 around which is fitted a collar 15, as of metal or the like, in the form of a clamp which is connected at 16 to a handle 17 by which the entire brewer, or just the lower bowl, may be lifted or moved about. This collar which rests directly against the neck exterior is also corrugated circumferentially in conformity therewith whereby it is readily locked against axial movement thereupon. By reason of the special configuration of the neck and surrounding collar, I avoid breaking strains incident to compressive forces exerted by the collar; and in addition, a lesser degree of compressive force will suffice to lock the collar fixedly against axial movement due to interlocking of the complementary corrugations already referred to. Both bowls which are desirably made from a heat resisting glass have relatively thin walls, as is common with utensils of this kind.

The wall of the upper bowl at the point where the flat annular base 5 is formed is slightly outset exteriorly (see Fig. 2), and is operated upon, as by grinding, to produce a circular sealing surface 20 which is characterized by a multitude of very fine hills and valleys spaced apart substantially evenly. Likewise the flange 12 of the lower bowl is flattened upon its top surface and treated, as by grinding, to provide an annular sealing surface 21 also characterized by a multitude of very fine hills and valleys spaced apart substantially evenly. At least one of these sealing surfaces is relatively wide, and if desired both may be so formed as indicated in the drawing. When the two bowls are interfitted, as shown in Fig. 1, the two sealing surfaces 20 and 21 are brought into interengagement and will continue to remain so irrespective of their relative positions laterally of each other. This is a feature which makes for (a) ease in fitting the two bowls together since no accurate positioning is necessary, and (b) for separation thereof since neither is maintained with pressure against the other at any point. The cooperating sealing surfaces which may be conditioned alike are adapted to establish between them a fluid seal which is sufficiently tight to permit the creation within the lower bowl of pressures, both plus and minus, as required during the brewing operation. Gravity is the only force needed to hold one bowl tightly against the other up to the time that a minus pressure develops in the lower bowl in the closing stage of the brewing operation. Initially the water, introduced into the lower bowl, is heated to the point that the generated steam, whose escape is prevented by the seal between the surfaces 20 and 21, forces the water upwardly through the hollow stem 8, then past the filter ball, and on into the upper bowl where it comes into contact with finely divided coffee particles.

The filter rod acts as a by-pass to permit up-flow of the water without lifting the upper bowl from its seat. With increase in pressure internally of the lower bowl, more and more water is displaced into the upper bowl, thereby adding to the gravity force which opposes separation of one bowl from the other. The resistance to movement on the part of the upper bowl increases progressively with increase in pressure internally of the lower bowl, and this fact may be relied upon to maintain the two bowls in sealed relation at all stages of the brewing operation at an intermediate point of which the water levels in the two bowls will be about as indicated in Fig. 1.

Inasmuch as there is no locking of one bowl to the other, frictionally or otherwise, successful operation requires the presence of two factors: (1) accurately formed cooperating surfaces conditioned for establishment of a seal between the two bowls, and (2) sufficient by-pass capacity on the part of the filter to relieve the lower bowl of pressure to the extent that the upper bowl will not become unseated to break the seal. The rod shown in Fig. 1 is one example of filter which may be so used, but other types which are serviceable for the purpose may be substituted for use with the type of constructions herein disclosed.

The seal provided by the ground joint is maintained fluid tight by the weight of the upper bowl plus the rod. The pressure developed during the brewing operation tends to lift the upper bowl and break the seal. This pressure is determined by the height the water must rise before its weight in the upper bowl more than compensates for the additional difference in levels. In the case of an upper bowl of eight-cup capacity (about 46 ounces), its weight, plus that of the rod, may be about 14 to 15 ounces, and with the ground coffee therein, the total weight is about .95 pound. The height to which the water must rise depends upon the amount thereof which is displaced from the lower bowl. Under ordinary conditions this may require a head of from two and a half to three and a half inches. If the mean diameter of the sealing surfaces is $X$ inches, then the value of $X$ for which the pressure conditions will have to be balanced will be as follows:

$$\text{Pressure from weight on seal} = \frac{.95}{\frac{\pi}{4}X^2} \text{ lbs./sq. in.}$$

Vapor pressure developed in lower bowl (say for 4 to 6 cups of coffee) $= \frac{2\frac{1}{2}''}{360} \times 15$ lbs./sq. in.

For balanced condition $$\frac{.95}{\frac{\pi}{4}X^2} = \frac{2\frac{1}{2} \times 15}{360}$$

$$X^2 = \frac{360 \times .95}{\frac{\pi}{4} \times 2.5 \times 15} = 11.5$$

$$X = 3.4 \text{ inches dia.}$$

This figure of 3.4 inches diameter which is theoretical requires that some factor of safety be allowed. For instance, it is found that with the rod and ground coffee in place, some restriction is offered to the up-flow of water into the upper bowl. This will increase the effective internal pressure required to raise the water into the upper bowl. There is also the weight pressure which must overbalance the internal pressure by a small amount in order that the seal may remain fluid tight. For these reasons, two and seven-eighths inches represents a practical maximum value for the X dimension in the case of a coffee maker of the size indicated.

The features inherent in this invention were in part disclosed in my application for patent filed October 23, 1941, Serial No. 416,147, of which this case is a continuation-in-part.

I claim:

1. A vacuum type coffee brewer comprising an open top liquid containing lower bowl having an upwardly facing continuous sealing surface and an upper infusion bowl having a downwardly facing continuous sealing surface freely resting on the sealing surface of the lower bowl and closing the open top thereof, the infusion bowl having a hollow stem depending into the lower bowl in spaced relation thereto to provide a liquid transfer means therebetween, the opposed sealing surfaces of the lower bowl and infusion bowl being relatively flat with the area therebetween subject to internal pressure so related to the normal weight of the infusion bowl as to maintain said opposed surfaces in sealing engagement during the initial transfer of liquid from the lower bowl to the infusion bowl, and the infusion bowl extending radially outwardly beyond the sealing surfaces for a distance sufficient to permit lateral spread, with corresponding diminution in rise, of the liquid head therein whereby to materially increase the effective weight of the infusion bowl for maintenance of the seal as liquid is transferred thereto.

2. A vacuum type coffee brewer comprising an open top liquid containing lower bowl having an upwardly facing continuous sealing surface and an upper infusion bowl having a downwardly facing cooperating sealing surface freely resting on the sealing surface of the lower bowl and closing the open top thereof, the infusion bowl having a hollow stem depending into the lower bowl in spaced relation thereto to provide a liquid transfer means therebetween, the opposed sealing surfaces of the lower bowl and infusion bowl comprising annular flat bearing and sealing surfaces supporting the intermediate portion of each bowl in spaced relation to each other, the area of the intermediate portions subject to internal pressure being so related to the normal weight of the infusion bowl as to maintain the annular surfaces in sealing engagement during rise in liquid head from the lower bowl above the plane of the sealing surfaces, and the infusion bowl extending gradually outwardly and upwardly beyond the sealing surfaces in a manner sufficient to permit lateral spread, with corresponding diminution in rise, of the liquid head therein whereby to materially increase the effective weight of the infusion bowl for maintenance of the seal as liquid is transferred thereto.

3. A vacuum coffee brewer comprising an open top liquid containing lower bowl having a restricted cylindrical neck terminating in an outwardly extending flange providing a relatively flat annular supporting and sealing surface, an upper infusion bowl provided with a restricted bottom portion extending within the neck of the lower bowl in spaced relation thereto and terminating in a depending liquid transfer stem, said infusion bowl being further provided with a relatively flat annular bearing surface extending from the restricted bottom portion for fluid-tight engagement with the first mentioned sealing surface when rested thereon, a filter element contained within the infusion bowl and supported by its restricted bottom portion over the upper end of the liquid transfer stem, the mean diameters of the sealing surfaces subject to internal pressure being so related to the normal weight of the infusion bowl and its contents as to maintain the surfaces in sealing engagement during initial rise in pressure and liquid head through the stem and above the plane of the sealing surfaces, and the diameter of the infusion bowl increasing sharply from the sealing surfaces for an extent sufficient to permit lateral spread, with corresponding diminution in rise, of the liquid head therein whereby to materially increase the effective weight of the infusion bowl for maintenance of the seal.

HARVEY CORY.